United States Patent Office 3,477,817
Patented Nov. 11, 1969

3,477,817
DIAGNOSTIC TEST FOR PRESENCE OF GALACTOSE
Ralph J. De Falco, 297 Rolling Knolls Way, Somerville, N.J. 08876
No Drawing. Filed Apr. 14 1966, Ser. No. 542,476
Int. Cl. G01n 33/16
U.S. Cl. 23—230                                    10 Claims

ABSTRACT OF THE DISCLOSURE

Diagnostic aid, composition, and process for determining the presence of galactose and polysaccharides thereof by admixing an aqueous solution of the sample, a dispersed suspension of rabbit red blood cells, and a soybean extract, whereby the absence of agglutination shows the presence of galactose and polysaccharides thereof.

---

This invention relates to a novel diagostic aid and compositions suitable for detecting the presence of galactose, and a novel process for detecting the presence of galactose in samples such as body fluids.

The presence of galactose in body fluids such as blood and urine is indicative of a digestive malfunction in which galactose is not metabolized. This condition, which is known as galactosemia or galactosuria, is caused by the lack of the enzyme required to metabolize galactose. Galactosemia is of considerable importance because it may lead to permanent brain damage in infants. However, if the condition is detected early enough, its harmful effects can be avoided by proper adjustment of the diet to eliminate foods containing galactose. Early detection of the condition would be greatly facilitated by a simple, accurate method for detecting galactosemia in infants. No completely satisfactory diagnostic test has heretofore been known. Present procedures are complicated, expensive, and are not suitable for general, widespread use.

To be acceptable, a diagnostic test for galactosemia should be simple and reliable. It must be specific for galactose and not susceptible to interference by other sugars and components of body fluids. It must also be capable of detecting very low concentrations of galactose. It is highly desirable that the test be adaptable to general use so that it can be employed routinely on all infants and simple enough to be performed by a technician.

In accordance with certain of its aspects, the process of this invention for detecting the presence of galactose and polysaccharides thereof in a sample comprises admixing said sample in aqueous solution, a dispersed suspension of rabbit red blood cells and a soybean extract prepared by extracting soybean with water at a temperature less than about 85° C.; and determining the presence of agglutination in said sample. The absence of agglutination under the test conditions shows the presence of galactose or polysaccharides thereof and the presence of agglutination demonstrates the absence of galactose and polysaccharides thereof.

The process of this invention is useful for detecting the presence of galactose and polysaccharides having a terminal galactose moiety. For example, it may be employed to test for galactose, melibiose, raffinose, lactose and other disaccharides and trisaccharides wherein galactose is a terminal group. For the sake of convenience, it will be understood that the term "galactose," as used herein and in the appended claims, shall mean any saccharide or polysaccharide containing a terminal galactose moiety. The test is useful with individual optical isomers or with racemic mixtures.

The novel diagnostic test of this invention is based upon the finding that soybean extract prepared as described hereinafter will agglutinate rabbit red blood cells but that this agglutination phenomenon is inhibited by galactose and polysaccharides containing terminal galactose. When a galactose-containing sample is mixed with rabbit red blood cells and the soybean extract, no agglutination or clumping is observed. If the sample tested does not contain galactose, agglutination of the rabbit red blood cells occurs and is readily observed.

It is a particular feature of the process of this invention that it provides a diagnostic test which is specific to galactose. The presence of other common hexoses and polysaccharides thereof do not interfere. For example, the presence or absence of galactose may be determined in a sample which contains sorbose, mannose, glucose, trehalose, etc. The detection of galactose in very low amounts, e.g. as little as 0.2 milligram or less, is readily accomplished by the process of this invention. Lower concentrations, down to trace amounts, may be detected by using suitable extraction and concentration techniques. The test is useful for determining galactose in any material, including foodstuffs, etc. and is particularly suitable for analyzing body fluids.

In the process of this invention, the sample to be tested will desirably be in aqueous solution, i.e. it will be prepared under conditions which ensure that any galactose present will be in aqueous solution. Where the sample is a body fluid such as blood or urine, any galactose present will already be in aqueous solution. Solid samples can be extracted with water to dissolve any galactose present. Insoluble materials, if any, may be filtered off prior to testing.

It is preferred that the aqueous solution of the sample contain a sufficient quantity of serologically compatible electrolyte to avoid lysis of the rabbit red blood cells under the test conditions. The most common and most preferred serologically compatible electrolyte is sodium chloride. Aqueous solutions containing between about 0.3% and about 1.5% sodium chloride are generally suitable. The limits are not rigid, but substantially lower saline concentrations may not be effective in preventing cell lysis while substantially higher concentrations may cause "salting-out" of the cells or otherwise interfere. When the test sample is a body fluid, addition of further electrolyte may be unnecessary.

The process of this invention is especially valuable as a diagnostic device for detecting galactosemia by the testing of body fluids such as urine or blood. The blood and urine of normal persons do not contain galactose. However, in those persons who have impaired ability to metabolize galactose, it is present in the blood and in the urine. Either fluid may be employed for diagnostic purposes.

Urine samples are readily obtained and readily employed in the test. The sample may be used without further preparation if desired. Blood samples are centrifuged and the supernatant plasma is employed in the test. The blood of some patients may contain a rabbit agglutinin which agglutinates rabbit red blood cells and therefore interferes with the galactose test by giving a false negative result. The presence of this interfering factor is readily determined by mixing a drop of the plasma from the blood sample with a drop of rabbit blood cell suspension and visually examining the mixture for agglutination. If the rabbit cell agglutinin is found to be present, it may be compensated for by running a blank (i.e. a test without the soybean extract) and comparing it with the normal test. Alternatively, the rabbit cell agglutinin may be removed from the sample prior to testing. A preferred technique for accomplishing this is by admixing the blood sample to be tested with a relatively large volume of rabbit blood cell suspension and centrifuging the mixture. The rabbit cell agglutinin is removed by the agglutinated rabbit cells and the supernatant is free of interfering factors and suitable for testing in accordance with the invention.

The rabbit blood cell suspension employed can be obtained commercially or can be prepared. Fresh cells are preferred. The suspension is prepared by centrifuging whole, fresh rabbit blood and redispersing the packed cells obtained in a solution of serologically compatible electrolyte, preferably saline solution. It is preferred to add an anticoagulant, such as Alsever's solution, to the rabbit blood prior to centrifuging. Where optimum storage life is required, the cells may be formalized, typically by treatment with a 1:4 dilution of commercial Formalin, followed by centrifuging and redispersing in saline containing about 1% formaldehyde. Because of the commercial availability of rabbit cell suspensions, however, it is generally preferred to use fresh, refrigerated samples when possible.

Rabbit blood cell suspensions suitable for use in the galactose test are preferably prepared by suspending about 1 to about 20 parts, say 5 parts, by volume of packed cells in 100 parts by volume of saline solution. The concentration of rabbit blood cells in the suspension can be varied over wide limits but the most readily observable test results are obtained within the noted range. The preferred saline concentration is between about 0.3 and 1.5% for the reasons hereinbefore noted.

The novel aqueous soybean extracts employed in this invention are those prepared by extracting soybean material with an aqueous medium at a temperature below about 85° C. Any source of soybean is suitable. Crude soybeans are preferably finely divided as by chopping or grinding to provide maximum surface area and facilitate extraction. The most preferred soybean sources are the commercially available isolated, defatted soy proteins such as the material sold under the trademark Promine-D by the Central Soya Company. Such materials are in convenient powdered, concentrated form.

The aqueous extract may be prepared by any suitable extraction technique. The soybean may simply be suspended in an aqueous medium. It may be placed in a column and extracted by passing the aqueous medium through it. Extraction may be accomplished in a single step or a number of steps.

The proportions of soybean and aqueous medium employed can vary widely and will depend upon the purity and physical state of the soybean, the extraction temperature, and the desired concentration in the extract. In general, about 0.5 to 25 grams of soybean will be employed per 100 parts by weight of aqueous medium. Preferably about 1 to 5 grams, say 2.5 grams, of soybean per 100 parts by weight of aqueous medium will be used.

Extraction is preferably effected by contacting the soybean with the aqueous medium at a temperature below about 85° C., and typically within the range of about 15 to 40° C. At temperatures below about 5° C., extraction may be undesirably slow. Extraction temperatures above about 85° C. may substantially reduce or destroy the agglutinating properties of the extract. Contact between the soybean and the aqueous medium is preferably maintained until extraction is substantially complete. A period of about 5 to about 300 minutes will generally be sufficient to produce satisfactory extraction, depending upon the amounts and types of raw materials employed, extraction temperature, degree of agitation, degree of subdivision of the soybean, etc. The longer extraction times are typically employed when low extraction temperatures or large amounts of soybean are used.

It is desirable that the aqueous soybean extract also contain a serologically compatible electrolyte in order to avoid lysing the rabbit blood cells with which it is mixed in the test for galactose. It has also been found that a higher degree of extraction and enhanced sensitivity are obtained when at least a portion of the extraction of the soybean is carried out with an aqueous solution of a serologically compatible electrolyte. Preferably, the electrolyte will be sodium chloride. Saline concentrations between about 0.3% and about 3% are suitable. At concentrations below about 0.3%, these additional advantages may not be fully realized, while substantially higher concentrations may cause "salting-out" or poorer extraction.

In accordance with a preferred embodiment of this invention, the finely divided soybean is first treated with plain water for a brief period and, thereafter, salt or saline solution is added thereto and the extraction completed. For example, 5 parts by weight of soybean is treated with 100 parts of distilled water for 5 minutes and 100 parts of 1% saline are added thereto and the extraction continued for an additional 20 minutes thereafter.

After the desired extraction, the aqueous extract is separated from the remaining undissolved material. Filtration through a coarse filter or any other suitable technique may be used. Preferably, the separation is effected by centrifuging. When the mixture of soybean and aqueous medium is centrifuged, it separates into three distinct layers, viz. a bottom layer of heavy sediment, an intermediate layer of substantially clear liquid, and a top layer of thick precipitate. The intermediate liquid layer is the aqueous extract which is employed in the practice of this invention.

The aqueous soybean extract is a moderately turbid, fluid aqueous liquid containing the soluble and colloidally suspendible portion of the soybean. The total solids concentration of the extract will vary depending upon the conditions of extraction.

The extract obtained by the above described procedure can be used directly in the process of this invention. However, it will usually be found that it is much more concentrated than is necessary. For reasons of economy and convenience, it is generally desirable to dilute the concentrated extract. Dilutions of 1:4 to about 1:64 are generally suitable. The appropriate dilution range can be simply and empirically determined in the following manner. Serial dilutions of 1:1, 1:2, 1:4, 1:8, etc. are each made on the abstract obtained. One drop of each dilution is admixed with one drop of a 5% rabbit blood cell suspension and the mixtures are visually observed for rapid agglutination. The highest dilution of extract at which agglutination occurs substantially instantaneously is the maximum which can be employed. Preferably, the concentration employed will be about 4 to 8 times as great as the minimum effective concentration.

It is generally desirable to add a compatible preservative to the extract to prevent bacterial growth during use. Various preservatives are effective and can be used, including merthiolate, sodium azide, etc. Merthiolate is especially preferred because it prevents sedimentation as well as bacterial attack.

All of the solutions to be used in the test should have a neutral or essentially neutral pH, to avoid lysing the rabbit blood cells. It is not normally necessary to employ neutralizing agents or buffers since the solutions usually have a natural pH between about 5.8 and 8. If greater deviations from neutrality occur, they can be corrected by use of a suitable buffer, e.g. imidazole.

The test for galactose provided by this invention is conducted by admixing the soybean extract, the test sample and the rabbit blood cell suspension. It is preferred that the test sample first be mixed with the soybean extract and the rabbit blood cells be thereafter added. Alternatively, the sample can be mixed with the rabbit blood cells and the soybean extract thereafter added; or all three may be mixed simultaneously. If the soybean extract be mixed with the rabbit blood cells before the test sample is added, agglutination of the cells will occur immediately. Although this agglutination can be reversed, the amount of galactose present in the sample may be insufficient to do so rapidly, thereby giving a falsely negative test.

Under the preferred test conditions, agglutination occurs substantially immediately if the sample does not contain galactose. Visual observation of agglutination is facilitated by streaking the mixture on a slide and illuminating it from below or by centrifuging the mixture. The former technique is especially suited for home use as a routine check on the efficacy of the diet of a galactosemic patient. In either case, the entire test can be completed in one or two minutes and very simple equipment is satisfactory.

By practice of suitable techniques, the test is also capable of giving quantitative or semi-quantitative analyses. Thus, if it is desired to estimate the concentration of galactose present, serial dilutions may be made on the sample. The lowest serial dilution at which inhibition of agglutination occurs is then noted. Serial dilutions are also made on a known standard galactose solution and the minimum concentration is determined. By comparison of this value with the results of the serial dilution of the test sample, the initial galactose concentration can be calculated. Alternatively, the aqueous soybean extract may be serially diluted and tested against a series of galactose solutions of known varying concentrations. It will be found that for each galactose concentration there is a maximum soybeans extract concentration (i.e. a minimum dilution of the original extract) at which no agglutination is observed. If higher concentrations of extract are employed, all of the galactose is exhausted and agglutination again occurs. By standardizing the serial dilutions of extract against known galactose concentrations, a standard reference chart is prepared which can be used for semi-quantitative analyses. It will be apparent that the same effect can be obtained by varying the amount of soybean extract employed, in the nature of a titration technique, rather than by varying the dilution of the extract.

The precise proportions of sample, aqueous soybean extract and rabbit blood cells used can be widely varied and will, to some extent depend upon the nature of the sample, concentrations, etc.

Generally, the amount of soybean extract employed may be about 0.25 to 4 parts per part of sample and the amount of rabbit red blood cells used may be about 0.25 to 4 parts per part of sample. When solutions having the preferred concentrations are employed, a ratio of about 1:1:1 is satisfactory.

Practice of this invention may be observed from the following illustrative examples. It will be understood that the invention is not limited to the specific embodiments disclosed, but includes all such modifications and variations which fall within its general scope.

EXAMPLE 1

This example illustrates the sensitivity of the novel process of this invention.

An aqueous soybean extract is prepared by suspending 5 grams of defatted soybean sold under the trademark Promine D in 100 ml. of distilled water at room temperature for about 20 minutes. An equal volume of 2% saline solution is then added and the suspension heated to 76° C. for 15 minutes. It is then cooled and centrifuged until a distinct separation is obtained. After centrifuging, there is a bottom layer of heavy sediment; an intermediate, almost clear, liquid layer; and a thick top layer. The intermediate layer is removed, diluted 16-fold with 1% saline, and employed in this example.

Solutions of D-galactose, melibiose, lactose and raffinose (0.1 molar) in 1% saline are prepared. Each solution is serially diluted by a factor of 1, 2, 4, 8, 16, 32, 64 and 128 to form a series of stock sugar solutions. An amount of 0.1 cc. of each sugar solution and 0.2 cc. of aqueous soybean extract is placed in individual centrifuge tubes and mixed for a few seconds. Thereafter, 0.05 cc. of a 5% aqueous suspension of rabbit red blood cells is added to each tube and the tubes are mixed and centrifuged. Each tube is visually inspected for agglutination.

The results of these tests are summarized in Table I wherein a minus (—) sign indicates no observable agglutination and a plus (+) sign indicates that agglutination was observed.

TABLE I

| Sugar | Dilution | | | | | | | |
|---|---|---|---|---|---|---|---|---|
| | 1 | 2 | 4 | 8 | 16 | 32 | 64 | 128 |
| D-galactose | — | — | — | — | — | — | — | + |
| Lactose | — | — | — | + | + | + | + | + |
| Raffinose | — | — | — | + | + | + | + | + |
| Melibiose | — | — | — | + | + | + | + | + |

As shown in Table I, the process of this invention provides a highly sensitive test for galactose, including polysaccharides containing galactose as a terminal group. Even at a dilution factor of 64, equivalent to 0.125 milligrams of galactose, it was possible to detect the presence of this sugar. By proper manipulation of test conditions, even smaller amounts may be detected. In similar tests, it was found that sorbose, D-mannose, D-glucose, D-trehalose and sucrose did not inhibit the agglutination of rabbit red blood cells and therefore did not give a positive test.

What is claimed is:

1. The process for determining the presence of galactose in a test sample which comprises admixing said sample in aqueous solution with a dispersed suspension of rabbit red blood cells and an aqueous soybean extract; and determining the presence of agglutination of said rabbit red blood cells.

2. The process of claim 1 wherein said sample is a body fluid.

3. The process of claim 1 wherein said sample is a blood sample.

4. The process of claim 1 wherein said sample is a urine sample.

5. The process of claim 1 wherein said admixing is carried out in the presence of about 0.3–3% by weight of a serologically compatible electrolyte.

6. The process of claim 1 wherein said soybean is extracted with aqueous saline solution.

7. A diagnostic aid device for determining the presence of galactose in a test sample comprising at least one container of rabbit red blood cell suspension and at least one container of aqueous soybean extract; said containers being in convenient spatial relationship so that they may be readily admixed together with said test sample.

8. A diagnostic aid comprising: (a) an aqueous saline soybean extract, said extract containing water, a serologically compatible electrolyte, the soluble and colloidally suspendible portions of soybean, and (b) a preservative therefor.

9. The composition of claim 8 wherein said preservative is merthiolate.

10. The composition of claim 8 wherein said serologically compatible electrolyte is present in a concentration between about 0.3% and about 3% by weight.

References Cited

UNITED STATES PATENTS 2,418,033  3/1947  Kamlet.
2,608,533  8/1952  Carson et al.
2,659,700  11/1953  Carson et al.

MORRIS O. WOLK, Primary Examiner

R. M. REESE, Assistant Examiner

U.S. Cl. X.R.

23—253; 252—408